United States Patent
Homme

[11] 3,835,366
[45] Sept. 10, 1974

[54] INVERTERS SUPPLYING A HIGH FREQUENCY ALTERNATING CURRENT

[75] Inventor: Edmond Cord Homme, Paris, France

[73] Assignee: Thomson-CSF, Paris, France

[22] Filed: Mar. 19, 1973

[21] Appl. No.: 342,434

[30] Foreign Application Priority Data
Apr. 21, 1972 France .............................. 72.14250

[52] U.S. Cl. ............................................ 321/45 R
[51] Int. Cl. ................................... H02m 7/52
[58] Field of Search ........... 321/27 R, 43, 44, 45 C, 321/45 R

[56] References Cited
UNITED STATES PATENTS

| | | | |
|---|---|---|---|
| 3,331,011 | 7/1967 | Landis | 321/44 |
| 3,341,767 | 9/1967 | Cielo | 321/45 C |
| 3,480,850 | 11/1969 | Gaboriaud | 321/27 R |
| 3,530,357 | 9/1970 | Leowald | 321/27 R |
| 3,601,683 | 8/1971 | Brown | 321/45 C |
| 3,609,511 | 9/1971 | Risberg | 321/45 C |

Primary Examiner—A. D. Pellinen
Attorney, Agent, or Firm—Oblon, Fisher, Spivak, McClelland & Maier

[57] ABSTRACT

A dc to ac electric power inverter which includes a series static inverter circuit, having at least two controlled rectifiers interconnected by a self-quench circuit and alternately switched on and off by trigger pulses. The triggering frequency is made equal to the a c output signal frequency divided by an integer greater than the number of rectifier pairs in use so that the upper frequency limit of the output signal is enhanced.

7 Claims, 4 Drawing Figures

INVERTERS SUPPLYING A HIGH FREQUENCY ALTERNATING CURRENT

BACKGROUND OF THE INVENTION

1. Field of the Invention

The present invention generally relates to inverters, i.e., static converters from D.C. to A.C., supplying a high frequency current therefor more particularly to inverters in which a sinusoidal output wave is obtained by means of an oscillating circuit periodically excited by current flow through controlled-conduction rectifier elements such as thyristors.

The invention further relates to inverters comprising at least one pair of rectifier elements forming electrical valves alternately conducting the current from a direct current source, to excite an oscillating circuit and to supply an alternating current thus generated to a load. The operation of the inverter is triggered by control pulses of appropriate polarity and chosen frequency recurrence, supplied by a generator and applied in turn to respective control electrodes of the rectifier elements.

DESCRIPTION OF THE PRIOR ART

In the past, the high frequency operation of inverter devices was greatly improved by utilizing a controlled rectifier element pair as an electrical valve. While generally somewhat satisfactory, a major drawback of prior inverter devices, and in particular of devices which utilized a single pair of controlled-conduction rectifier elements, is that the attainable frequency of the generated sinusoidal wave cannot exceed an upper limit, beyond which correct operation is impossible. This frequency limitation depends both upon the nature of the circuit arrangement chosen which determines the rectifiers blocking period $T_1$ and upon a recovery time characteristic $T_2$, that is to say the intrinsic turn-off time $T_2$ of the rectifier elements, this characteristic corresponding, for example, to the deionization time in the case of a thyratron during which the forward voltage is blocked only when its current is reduced below a prescribed value termed the "holding current". The higher is the frequency of the generated sinusoidal wave, the greater is the reduction in the blocking time $T_1$.

Correct operation of the inverter is impossible as soon as the blocking time $T_1$ becomes less than the recovery or turn-off time $T_2$ of the rectifier elements.

To overcome this drawback, it has been proposed in the prior art that the number of pairs of rectifier elements should be increased and the triggering of the elements of each pair controlled sequentially so that only one element at a time be conductive, the second element of the pair only being triggered after all the first elements of each pair were made conductive in turn. The blocking time, previously $T_1$, of the rectifier elements in the inverter then became $(m - 1) T/2 + T_1$ where $m$ is the number of pairs of elements and $T$ is the periodicity of the resultant alternating signal. As the frequency of the signal rises, $T$ reduces, as also does $T_1$. Thus, in order that the inequality relation $(m - 1) T/2 + T_1 > T_2$ be satisfied, it was merely necessary to choose $m$ sufficiently large.

The increase in the number $m$ of pairs of rectifier elements used, leads to a corresponding increase in the complexity and cost of the inverter, which become very substantial if the frequency to be produced is high.

SUMMARY OF THE INVENTION

Accordingly, one object of the present invention is, provide a new and improved inverter which overcomes the aforesaid drawbacks in an inverter embodiment by choosing several circuit parameters in order to effect a noticeable increase in the generated signal maximum frequency without interfering with correct operation of the inverter at this frequency.

Another object of the present invention is to provide a new and improved unique inverter with improved high frequency operation with a smooth sinusoidal output.

Briefly, in accordance with this invention, the foregoing and other objects are in one aspect attained by providing an improved inverter comprising input terminals connectable to a supply source of direct current;

output terminals connectable to an alternating current load;

means for electrically interconnecting said input and output terminals, said means comprising at least one pair of controlled conduction rectifier type switch means, series connected through complementary first and second alternating current-conducting paths including inductance means associated with a conductance means providing a resonant circuit which forms a conversion oscillating circuit coupled to said output terminals;

a control trigger generator for supplying respective gates firing pulses for alternately switching said switch means from an off-state to an on-state at a predetermined operating frequency rate and thus periodically exciting said oscillating circuit;

and wherein a time interval ($T_o$) separating two successive triggerings of an identical switch means is made equal to a predetermined full cycle period ($T$) of the produced a.c. signal multiplied by a integer $p$ selected to be greater than the integral number $m$ of said switch means pairs, the duration of said period of time $T$ being longer than a conduction time $T_3$ corresponding at most to a half-cycle period ($T/2$) so that the blocking time $T_4$ of each said switch means is increased by $p \cdot T/2 - T_3$, whereby the high frequency performance of the inverter circuit of the present invention is enhanced.

BRIEF DESCRIPTION OF THE DRAWING

Other features and advantages of the present invention will become apparent in the course of th ensuing description, given by way of example with reference to the attached drawings, in which.

DETAILED DESCRIPTION OF THE PREFERRED EMBODIMENTS

Figure 1:
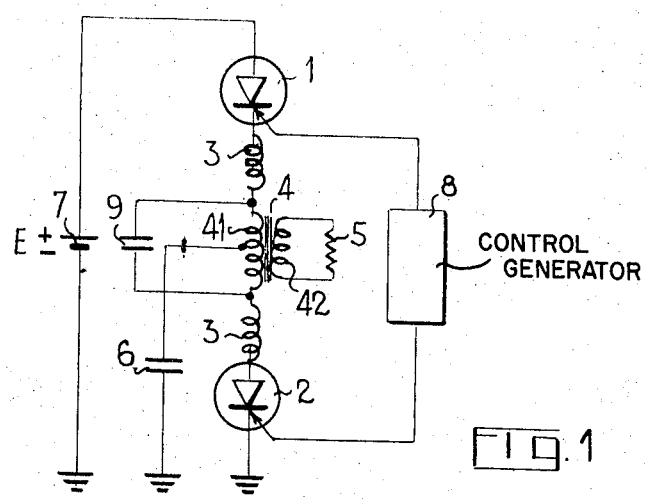
FIG. 1 illustrates a block diagram of a conventional inverter incorporating the improvements in accordance with the present invention.

Referring now to the drawings, wherein like reference numerals designate identical or corresponding parts throughout the several views, and more particularly FIG. 1, a block diagram of an inverter is shown comprising a single pair of controlled-conduction rectifier elements in a conventional series arrangement and means combined to the circuit arrangement in accordance with the present invention. An inverter system comprises a source 7 of direct voltage E, with one terminal earthed, a load impedance 5 and an inverter proper, connected in parallel to the source 7 and supplying the load 5 with alternating current. The inverter comprises two rectifier elements 1 and 2, the conduction of which is controlled by a trigger signal generator 8. The two rectifiers 1 and 2 are connected in series through two inductors 3 of the same inductance L, which are utilized to tune an oscillator circuit, acting as a converter, and are arranged between a cathode of the first rectifier 1 and an anode of the second rectifier 2. A primary winding 41 of an output transformer 4 is connected between the two tuning inductors 3 and has a centre-tap connected to a tuning capacitor 6 of capacitance C, which is earthed. This capacitor C, with the inductors L, creates a resonant circuit which constitutes a converter oscillator of the inverter. The load impedance 5 of the inverter is connected in parallel across the secondary of the output transformer 4.

The direct voltage source 7 being connected to the anode of the rectifier 1 and to the cathode of the rectifier 2, the said rectifiers are rendered conductive or blocked in an alternating fashion by means of voltage or current pulses supplied from the control generator 8 and applied periodically to the respective control electrodes of the rectifiers 1 and 2. The time of conduction of each rectifier 1 and 2, is defined by the time constant of the oscillatory circuit, this in turn being determined by choice of the values L and C of the inductors 3 and the capacitor 6. In accordance with one feature of the invention, these values L and C are chosen so that the conduction time of each rectifier is equal to a half periodicity $T/2$ of the alternating signal produced, that is to say that these values satisfy the relationship $$LC(2\pi/T)^2 = 1.$$

In conventional inverters, with a single pair of rectifier elements, an interval $T_o$ separating two successive triggerings an identical rectifier, 1 or 2, is always equal to the periodicity $T$ of the resultant alternating signal. In accordance with one feature of the invention, however, this interval $T_o$ is made equal to a whole number multiple of the periodicity $T$ of the signal. In the present example $T_o = pT$ where $P > 1$.

Figure 2:
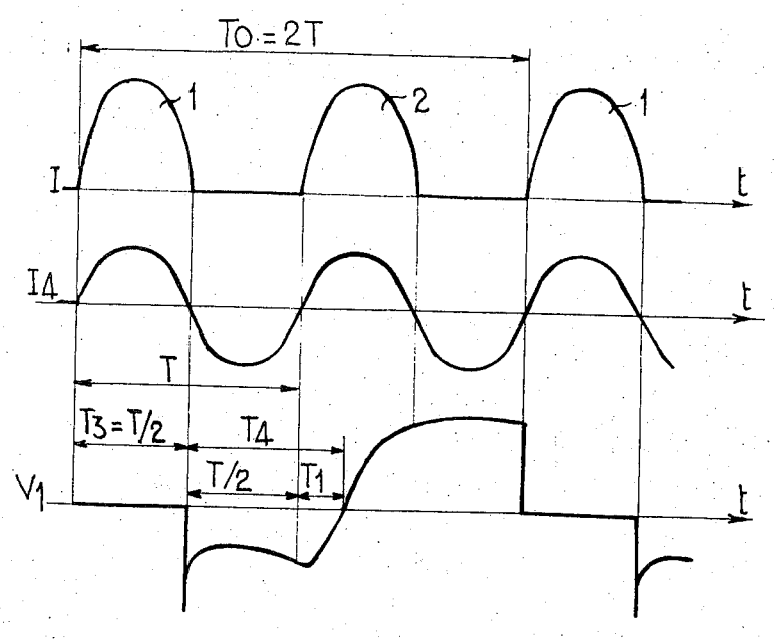
FIG. 2 illustrates timing diagrams showing the current and voltage at various points in the inverter.

FIG. 2 illustrates timing diagrams designed to facilitate the description of the operation of the inverter and pertains to currents I in the rectifiers 1 and 2 and to a fundamental current $I_4$ flowing in a primary winding 41 of the transformer 4, as well as to the voltage $V_1$ across the terminals of the rectifier element 1. These diagrams relate to an inverter system similar to that shown in FIG. 1, for which the triggering interval $T_o$ of the rectifiers 1 and 2 is made equal to an even whole number multiple of the periodicity $T$ of the resultant alternating signal, or in other words $T_o = 2T$, while a conduction time $T_3$ is made equal to $T/2$.

The diagram plotting the current I flowing through the rectifiers 1 and 2, is thus made up of two damped sinusoidal half waves of duration $T/2$, separated from one another by a time $T/2$, where the successive half-waves corresponding to an identical rectifier, are separated by a period of $2T$.

The diagram of the voltage $V_1$ across the terminals of the rectifier 1 shows that after having remained conductive for a time of $T/2 = T_3$, the element 1 has a time of $T_4 = T/2 + T_1$ to return to the blocked state; this time is called the blocking time. It is well-known that this blocking time $T_4$ becomes shorter as the frequency $F$ of the current produced becomes higher. However, to achieve correct operation of this kind of inverter, it is necessary for the blocking time $T_4$ at all times to be longer than a value, $T_2$, of the intrinsic turn-off time of the elements 1 and 2, accordingly turn-off time $T_2$ thus imposes a top limit on the inverter frequency.

The diagrams shown in FIG. 2 illustrate how the improvements in accordance with the invention make it possible to raise this frequency limit. In other words in the chosen example the blocking time $T_4$ is always longer than $T_2$. Consequently, a rectifier element whose turn-off time is $T_2$, can be switched at a conversion frequency of $F = 1/2T_2$, in this kind of inverter. By way of example, in a prior art circuit employing rectifiers in which the turn-off value $T_2$ is equal to 25 microseconds, the maximum conversion frequency $F$ cannot be much above 8 kHz whereas an improved circuit in accordance with the present invention makes it possible to achieve frequencies in the order of 20 kHz using the same rectifiers.

However, in the inverter in accordance with the invention, in order for the output voltage to approach as close as possible to a sinusoidal form, it is necessary that the current produced by the rectifier elements be filtered. In accordance with yet another feature of the invention, this filtering is carried out by tuning the output transformer 4 to the conversion frequency $F$, by means of a capacitor 9 for example in parallel with its primary winding 41. The load Q-factor of the transformer determines the quality of the filtering achieved and is chosen for example in the order of four. The fact that the transformer 4 is tuned, makes it possible to reduce its saturation level and facilitates its production by reducing the number of turns required on its primary winding 41.

In the case where the triggering time $T_o$ of the rectifiers 1 and 2 is made equal to an odd whole number multiple of the period $T$ of the resultant alternating signal, the currents produced by the rectifiers 1 and 2 and flowing through the primary 41 of the transformer 4, have opposite polarities and it is therefore necessary to appropriately adapt the device shown in FIG. 1. This kind of adaptation consists, for example, in employing a different winding direction for the two primary half-windings 41 of the transformer 4.

Figure 3:
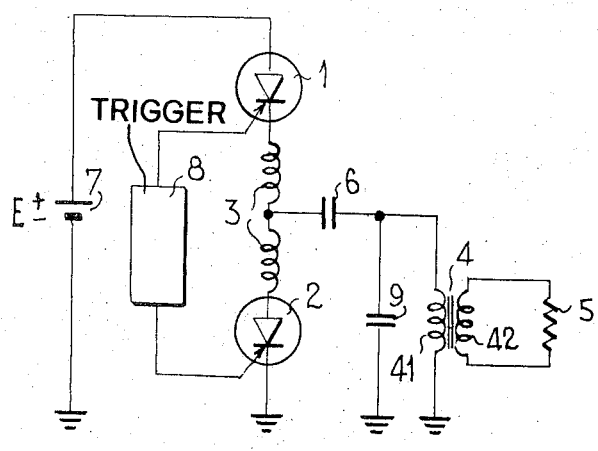
FIG. 3 illustrates a block diagram of an inverter designed to operate in accordance with another embodiment of the invention.

However, in this latter case, a structure similar to that schematically illustrated in FIG. 3, is better. It differs from that of FIG. 1 by the fact that the two tuning inductors 3 have a common point. Between this common point and earth, there is a series arrangement of the tuning capacitor 6, with the inductors 3 and the primary winding 41 of the output transformer 4; the tuning capacitor 9 of said transformer 4 is connected in parallel across the primary winding 41. In this kind of circuit, current flowing through the primary 41 of the transformer 4, due to the rectifier 1, is of opposite polarity to that due to the rectifier 2.

Figure 4:
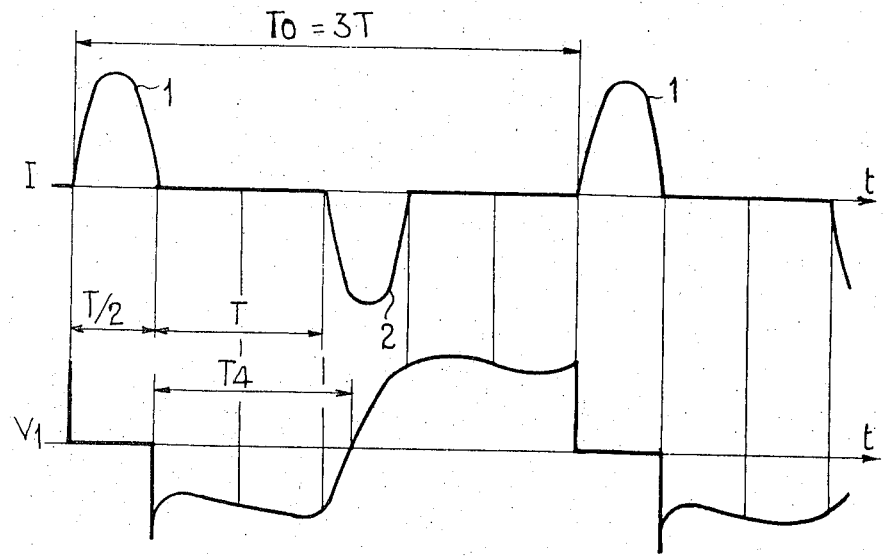
FIG. 4 illustrates timing diagrams pertaining to said embodiment.

FIG. 4 illustrates a timing diagram for the current I flowing through the rectifiers 1 and 2, and that for the voltage $V_1$ appearing across the terminals of the rectifier 1, in a case where the interval $T_o = 3\ T$. These diagrams, corresponding for example to the case shown in FIG. 3, illustrate how the blocking time $T_4$ is longer than the periodicity $T$ of the alternating signal.

In the foregoing description, mention has been made solely of inverter devices in which the number $m$ of pairs of controlled-conduction rectifier elements is equal to one, and the number $p$ of periods $T$ of the resultant alternating signal which separates two successive triggerings of an identical element, in all cases is greater than $m$.

In contradistinction to the conventional inverter systems with the time interval separating the triggering of one element from that of the next being always equal to $T/2$, in the inverter systems in accordance with the present invention, this interval has a duration $p/m\ T/2$ as a consequence of which the generated voltage experiences an attenuation $A$ between two consecutive triggerings. It is well-known that in a damped oscillatory circuit the law of decay of the voltage takes the form $e(-\pi t/QT)$, $Q$ being the quality factor under load of the oscillatory circuit. If the attenuation $A$ which can be tolerated is expressed in decibels, it can be shown that this Q-factor should be made greater than $Q_o = 3.4/A\ p/m$.

When the number $m$, of pairs of rectifier elements is equal to 1, the value of $Q_o$ may be quite high according to how large the number $p$ of periods $T$ is or how small the tolerated attenuation $A$ is, and this has the effect of reducing the pass-band of the resultant alternating signal.

In accordance with the present invention, this pass-band limitation is obviated by making $m$ greater than 1 but at the same time less than $p$ or $1 < m < p$. The frequency of the signal which such an inverter can then supply is in the order of $F = p - 1/m \times 1/T_2$. For an inverter of the prior art type, in which $p = m$, if $m = 2$ this frequency is equal to $F = 1/2T_2$, whereas for an inverter in accordance with the present invention, if $m = 2$ and for example $p = 4$, we obtain $F = 3/2T_2$. This represents a substantial increase in frequency.

Thus, inverters or electrical power converter devices have been described, in which the maximum operating frequency has been substantially increased and which have the same numbers of pairs of identical rectifier elements, as the prior art devices.

The foregoing description has been confided to the case in which the conduction time $T_3$ is equal to $T/2$. However, it goes without saying that the frequency performance of such inverters can be still further improved by reducing said time $T_3$ and this is achieved by choosing the values $L$ and $C$ of the inductor 3 and the capacitor 6, so that the expression $LC\ (2\ \pi/2T_3)^2 = 1$ is satisfied. The maximum frequency which can then be achieved is in the order of $F = p/mT_2 + 2T_3 > p - 1/mT_2$ if $T_3 < T/2$.

Inverters in accordance with those hereinbefore described can advantageously be utilized as transmitters in sonar systems, or again to supply induction ovens in view of their improved high frequency performance.

Of course, the invention is not limited to the embodiment described and shown which was given solely by way of example.

What is claimed as new and desired to be secured by letters patent of the United States is:

1. A d.c. to a.c. power inverter comprising:
   input terminals connectable to a source of direct current,
   output terminals connectable to an alternating current load,
   circuit means for connecting said input and output terminals, said circuit means comprising at least one pair of controlled-conduction rectifier type switch means connected in series through equal first and second inductors,
   a capacitor coupled to a midpoint between said first and second inductors and to a ground or reference potential, said interconnected capacitor and inductors forming a conversion oscillator circuit;
   control trigger generator means for supplying gate firing pulses to said switch means,
   said conversion oscillator circuit means functioning together with said control trigger generator means to supply an a.c. signal to said output terminals when each of said switch means is gated at a time interval equal to an integral number times the cycle period of said output alternating current wherein said integral number is greater than the number of pairs of switch means in said inverter.

2. A d.c. to a.c. power inverter as in claim 1, further comprising:
   an output transformer coupled between said first and second inductors; and
   said capacitor coupled to a center tap of said output transformer.

3. A d.c. to a.c. power inverter as in claim 1, further comprising:
   an output transformer coupled between said capacitor and said ground potential.

4. A d.c. to a.c. power inverter as in claim 1, wherein said control trigger generator supplies respective firing pulses for alternately switching said switch means from an off-state to an on-state at a predetermined operating frequency thus periodically exciting said conversion oscillator circuit,
   wherein the time interval separating two successive triggerings of each switch means is made equal to a predetermined full cycle period $T$ of said output a.c. signal multiplied by an integer $p$ selected to be greater than an integer $m$, where $m$ is the number of pairs of said switch means, said period $T$ being longer than a conduction time $T_3$ corresponding at most to a halfcycle period $T/2$ so that a blocking time $T_4$ of each said switch means is thus increased by $p \cdot T/2 - T_3$ whereby the maximum output frequency of said power inverter is enhanced.

5. An inverter as claimed in claim 4, in which the maximum a.c. signal frequency is dependent on a quality Q-factor under load, $Q_o$, of said conversion oscillating circuit and wherein said Q-factor under load is selected to be greater than $3.4/A \cdot p/m$, $A$ being the tolerated voltage attenuation expressed in decibels, whereby the maximum a.c. signal frequency then produced by the inverter is close to $F = p/(mT_2 + 2T_3)$, $T_2$ being the intrinsic or turn-off time of the rectifier elements used.

6. An inverter as claimed in claim 4, wherein the values of the inductance $L$ of the series inductors and the capacitance $C$ of the tuning capacitor of said conversion oscillating circuit are chosen so that the relationship $LC(2\pi/2T_3)^2 = 1$ is satisfied, whereby the maximum frequency $F$ of the signal produced by the inverter increases as the conduction time $T_3$ decreases.

7. An inverter as claimed in claim 4, wherein said a.c. signal output circuit includes a transformer connected between said conversion oscillating circuit and said load circuit, said transformer being tuned to the frequency of said generated a.c. signal and providing filtering thereof.

* * * * *